United States Patent
Katahata et al.

(10) Patent No.: US 12,307,773 B2
(45) Date of Patent: May 20, 2025

(54) INFORMATION MANAGEMENT DEVICE AND INFORMATION MANAGEMENT METHOD FOR CLASSIFYING EVENT OCCURRED IN EQUIPMENT AND GENERATING MAINTENANCE INFORMATION

(71) Applicant: OMRON Corporation, Kyoto (JP)

(72) Inventors: Takatoshi Katahata, Kizugawa (JP); Reiko Hattori, Kyoto (JP); Yuya Ota, Kyotanabe (JP); Yuki Hirohashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 1000 days.

(21) Appl. No.: 17/270,457

(22) PCT Filed: Mar. 6, 2019

(86) PCT No.: PCT/JP2019/008829
§ 371 (c)(1),
(2) Date: Feb. 23, 2021

(87) PCT Pub. No.: WO2020/144876
PCT Pub. Date: Jul. 16, 2020

(65) Prior Publication Data
US 2021/0326600 A1    Oct. 21, 2021

(30) Foreign Application Priority Data
Jan. 10, 2019   (JP) .................................. 2019-002772

(51) Int. Cl.
*G06V 20/52*      (2022.01)
*G06F 11/30*      (2006.01)
(Continued)

(52) U.S. Cl.
CPC .......... *G06V 20/52* (2022.01); *G06F 11/3072* (2013.01); *G06Q 10/20* (2013.01);
(Continued)

(58) Field of Classification Search
CPC ............... G06V 20/52; G06Q 10/0639; G05B 23/0229; G05B 23/0293; H04B 17/29; G06B 23/0283
See application file for complete search history.

(56) References Cited

U.S. PATENT DOCUMENTS 6,871,326 B1 * 3/2005 Kazemi ................ G06Q 10/087
715/804
2012/0029678 A1 * 2/2012 McGreevy ............. G06Q 10/06
700/108

(Continued)

FOREIGN PATENT DOCUMENTS

CN       108121307      6/2018
CN       108732756     11/2018
(Continued)

OTHER PUBLICATIONS

Office Action of Japan Counterpart Application, with English translation thereof, issued on Apr. 11, 2023, pp. 1-6.
(Continued)

*Primary Examiner* — Eric J Yoon
(74) *Attorney, Agent, or Firm* — JCIPRNET

(57) ABSTRACT

An information management device includes: a first data storage unit which stores first data relating to at least one of data on equipment and operation behavior data concerning the equipment up to occurrence of an event; an event information generation unit which classifies the event on the basis of the first data and generates event information associated with the first data; a second data storage unit which stores second data in which the data on the equipment
(Continued)

encompassing before and after maintenance work in response to the event is associated with maintenance behavior data concerning the equipment; a maintenance information generation unit which associates the event information with the second data and generates maintenance information corresponding to each piece of event information; and a maintenance information storage unit which stores the generated maintenance information.

14 Claims, 14 Drawing Sheets

(51) Int. Cl.
    *G06Q 10/20*      (2023.01)
    *G06Q 10/0639*      (2023.01)
    *G06V 40/20*      (2022.01)

(52) U.S. Cl.
    CPC ..... *G06F 2201/86* (2013.01); *G06Q 10/0639* (2013.01); *G06V 40/23* (2022.01); *G06V 2201/07* (2022.01)

(56) References Cited

U.S. PATENT DOCUMENTS

| | | | |
|---|---|---|---|
| 2012/0271587 A1 | 10/2012 | Shibuya et al. | |
| 2012/0316835 A1 | 12/2012 | Maeda et al. | |
| 2013/0282336 A1 | 10/2013 | Maeda et al. | |
| 2015/0095639 A1* | 4/2015 | Relyea | H04L 63/102 707/781 |
| 2016/0078403 A1* | 3/2016 | Sethi | G06Q 10/0875 705/26.81 |
| 2016/0092808 A1 | 3/2016 | Cheng et al. | |
| 2018/0247024 A1* | 8/2018 | Divine | G16H 40/20 |
| 2018/0330287 A1* | 11/2018 | Tripathi | G06Q 10/06 |
| 2019/0121318 A1* | 4/2019 | Fan | G05B 19/4065 |
| 2019/0362321 A1* | 11/2019 | Beyer | G06Q 10/20 |

FOREIGN PATENT DOCUMENTS

| | | |
|---|---|---|
| JP | 2002175377 | 6/2002 |
| JP | 2005202886 | 7/2005 |
| JP | 2011081697 | 4/2011 |
| JP | 2011145846 | 7/2011 |
| JP | 2012137934 | 7/2012 |
| JP | 2015088173 | 5/2015 |
| JP | 2017004358 | 1/2017 |
| JP | 2017045147 | 3/2017 |
| JP | 2018097791 | 6/2018 |
| JP | 2018128855 | 8/2018 |
| WO | 2011043108 | 4/2011 |
| WO | 2015045851 | 4/2015 |

OTHER PUBLICATIONS

"Office Action of China Counterpart Application", issued on Dec. 4, 2023, with English translation thereof, pp. 1-19.

"Search Report of Europe Counterpart Application", issued on Sep. 7, 2022, p. 1-p. 8.

"International Search Report (Form PCT/ISA/210) of PCT/JP2019/008829", mailed on Jun. 4, 2019, with English translation thereof, pp. 1-3.

"Written Opinion of the International Searching Authouirty (Form PCT/ISA/237) of PCT/JP2019/008829", mailed on Jun. 4, 2019, with English translation thereof, pp. 1-10.

Office Action of Japan Counterpart Application, with English translation thereof, issued on Oct. 12, 2022, pp. 1-6.

\* cited by examiner

| No. | Event | First data | First label |
|---|---|---|---|
| 1 | Error process F | Information regarding error route e1 | F001 |
| 2 | Error process F | Information regarding error route e2 | F002 |
| 3 | Error process F | Information regarding error route e3 | F003 |
| . | . . . | . . . | . . . |

| No. | Event | First data | | First label |
|---|---|---|---|---|
| 1 | Defect F1 | Degree of abnormality f01 | Degree of divergence (K2-K1) | F011 |
| 2 | Defect F1 | Degree of abnormality f02 | Degree of divergence (K4-K1) | F012 |
| 3 | Defect F2 | Degree of abnormality f03 | Degree of divergence (K6-K1) | F003 |
| 4 | Defect F2 | Degree of abnormality f04 | Degree of divergence (K8-K1) | F007 |
| . | . . . | . . . | | . . . |

FIG. 7

| No. | Event | History (difference or deviation) data | Maintenance work process data |
|---|---|---|---|
| 1 | Defect F3 | Setting value (K2-K1) | Operation Op1 ⟶ Setting value K3 ⟶ Operation Op6 |
| | | Setting value (L2-L1) | Operation Op1 ⟶ Setting value K3 ⟶ Operation Op2 |
| | | Measured value (m2-m1) | Operation Op4 |
| ⋮ | ⋮ | ⋮ | ⋮ |

FIG. 9

| No. | Event | History (difference or deviation) data | Maintenance moving image data |
|---|---|---|---|
| 1 | Defect F4 | Setting value (K12-K1) · Measured value (m4-m1) | Maintenance moving image M001 |
| 2 | Defect F5 | Setting value (L4-L1) · Measured value (m6-m1) | Maintenance moving image M002 |
| 3 | Defect F6 | Setting value (M2-M) · Measured value (n2-n1) | Maintenance moving image M003 |
| * | * | * | * |

FIG. 10

| No. | Event | History (difference or deviation) data | Screen transition data |
|---|---|---|---|
| 1 | Defect F7 | Setting values (M4, N2, P) →Setting values (M1, N1, L2)、 Measured value (m8)→Measured value (m1) | Screen d1 (setting value M4 is changed to M1) →Screen d2 (setting value N2 is changed to N1) →Screen d3 (setting value L2 is added) →Screen d4 (setting value P is deleted) |
| 2 | Defect F8 | Setting values (· · ·)→ Setting values (· · ·)、 Measured (· · ·)→ Measured value value | Screen d5→Screen d6→Screen d7 |
| · | · | · | · |

FIG. 11

| No. | Event information | | | Second data | | | |
|---|---|---|---|---|---|---|---|
| | Event | First data | First label | Event | Equipment data | Maintenance information | Second label |
| 1 | Error process F | Information regarding error route e1 | F001 | Defect F3 | Setting value (K2-K1) Setting value (L2-L1) Measured value (m2-m1) | Operation Op1→Setting value K3→Operation Op6 Operation Op1→Setting value K3→Operation Op2 Operation Op4 | F001003 |
| 2 | Error process F | Information regarding error route e2 | F002 | Defect F7 | Setting values (M4, N2, P)→Setting values (M1, N1, L2) 、 Measured value (m8)→Measured value (m1) | Screen d1 (setting value M4 is changed to M1) →Screen d2 (setting value N2 is changed to N1) →Screen d3 (setting value L2 is added) →Screen d4 (setting value P is deleted) | F002007 |
| 3 | Error process F | Information regarding error route e3 | F003 | Defect F4 | Setting value (K12-K1) Measured value (m4-m1) | Maintenance moving image M001 | F003004 |
| ⋅ | ⋅⋅⋅ | ⋅⋅⋅ | ⋅⋅⋅ | ⋅⋅⋅ | ⋅⋅⋅ | ⋅⋅⋅ | ⋅⋅⋅ |

FIG. 12

INFORMATION MANAGEMENT DEVICE AND INFORMATION MANAGEMENT METHOD FOR CLASSIFYING EVENT OCCURRED IN EQUIPMENT AND GENERATING MAINTENANCE INFORMATION

CROSS-REFERENCE TO RELATED APPLICATION

This application is a 371 application of the International PCT application serial no. PCT/JP2019/008829, filed on Mar. 6, 2019, which claims the priority benefits of Japan Patent Application No. 2019-002772, filed on Jan. 10, 2019. The entirety of each of the above-mentioned patent applications is hereby incorporated by reference herein and made a part of this specification.

BACKGROUND

Technical Field

The present invention relates to an information management device and an information management method.

Related Art

Patent Literature 1 discloses a maintenance information transmission system that is configured to select a maintenance content from a customer information DB (database) and a standard maintenance DB on the basis of latest detection data obtained by detecting an operation status of an industrial machine, calculate maintenance information such as a maintenance cost and a maintenance time, and transmit the obtained maintenance information to a customer and a maintenance company at any time.

Patent Literature 2 discloses a system that supports failure repair of a machine by sending failure repair information to a user side from a manufacturer side, and the system is configured to include a sensor detecting an operation state of a machine, a failure diagnosis part monitoring whether or not the machine fails at all times, a storage part storing a failure history and a maintenance history, and a maintenance process reproduction part reproducing and presenting maintenance process information on a screen of a display device of a user-side computer.

Technical Problems

In the maintenance information transmission system disclosed in Patent Literature 1, since a maintenance content is simply selected as a recommended maintenance content from the standard maintenance DB (the DB that stores standard maintenance information of the industrial machine in advance), a maintenance content for an actual operation status of the industrial machine and a content of standard maintenance may not appropriately correspond to each other, and thus there is a problem in that efficient maintenance cannot be performed.

In the support system disclosed in Patent Literature 2, maintenance process information when a failure in a machine is repaired is stored in the storage part, and the maintenance process information is presented on the screen of the display device of the user-side computer when the same failure occurs in the machine again.

However, in the support system disclosed in Patent Literature 2, information up to the occurrence of the failure in the machine is not taken into consideration. For example, even when a failure occurs in the same part of the machine, in a case where a process or an operation performed before the occurrence of the failure differs, a content or a process of maintenance work may differ. In the support system disclosed in Patent Literature 2, since the information up to the occurrence of the failure in the machine is not taken into consideration, there is a problem in that appropriate and efficient maintenance cannot be performed on the failure that has occurred.

CITATION LIST

Patent Literature

[Patent Literature 1]
Japanese Patent Application Laid-Open No. 2002-175377
[Patent Literature 2]
Japanese Patent Application Laid-Open No. 2005-202886

SUMMARY

Solution to Problems and Effects

The present invention has been made in light of the problems, and an objective thereof is to provide an information management device and an information management method capable of assisting with appropriate and efficient maintenance to be performed on an event having occurred in equipment.

In order to achieve the objective, according to the present disclosure, there is provided an information management device (1) managing information for assisting with maintenance corresponding to an event having occurred in equipment, the information management device including: a first data storage unit that stores first data relating to at least one of data regarding the equipment and operation behavior data for the equipment up to occurrence of the event; an event information generation unit that classifies the event on the basis of the first data stored in the first data storage unit, and generates event information associated with the first data; a second data storage unit that stores second data in which data regarding the equipment and maintenance behavior data for the equipment encompassing before and after maintenance work corresponding to the event are associated with each other; a maintenance information generation unit that generates maintenance information corresponding to each piece of the event information by associating the event information generated by the event information generation unit with the second data stored in the second data storage unit; and a maintenance information storage unit that stores the maintenance information which corresponds to each piece of the event information and is generated by the maintenance information generation unit.

According to the information management device (1), the event and the first data up to the occurrence of the event are associated with each other by the event information generation unit, and thus it is possible to classify the event finely on the basis of the data regarding the equipment or the operation behavior data for the equipment up to the occurrence of the event. The event information and the second data are associated with each other by the maintenance information generation unit such that the maintenance information corresponding to each piece of the event information (that is, each classified event) is generated. Therefore, the maintenance information can be managed in association with each piece of the event information (each classified event). Consequently, in a case where the event occurs during an operation of the equipment, it is possible to assist with appropriate and efficient maintenance work in which a status up to the occurrence of the event is taken into consideration, by using the maintenance information.

According to the information management device (2) related to the present disclosure, in the information management device (1), the first data includes, as the data regarding the equipment, data relating to an error route in a control flow for the equipment up to the occurrence of the event. The event information generation unit classifies the event on the basis of the data relating to the error route, and generates information associated with the data relating to the error route for each classified event as the event information.

According to the information management device (2), since the event is associated with the data relating to the error route in the control flow for the equipment up to the occurrence of the event by the event information generation unit, the event can be classified finely in accordance with the error route in the control flow for the equipment up to the occurrence of the event. The maintenance information can be managed in association with each classified event by the maintenance information generation unit. Consequently, in a case where the event occurs during an operation of the equipment, it is possible to assist with appropriate and efficient maintenance work in which the error route in the control flow for the equipment up to the occurrence of the event is taken into consideration, by using the maintenance information.

According to the information management device (3) related to the present disclosure, in the information management device (1), the first data includes work moving image data of a worker as the operation behavior data for the equipment, and includes data relating to at least one of setting data and measured data for the equipment as the data regarding the equipment. The event information generation unit includes an abnormality degree calculation part that calculates a degree of abnormality with respect to a normal operation behavior on the basis of the work moving image data of the worker, and a divergence degree calculation part that calculates a degree of divergence from a normal value on the basis of a change in the data regarding the equipment, and the event information generation unit classifies the event on the basis of the degree of abnormality calculated by the abnormality degree calculation part and the degree of divergence calculated by the divergence degree calculation part, and generates information in which the degree of abnormality and the degree of divergence are associated for each classified event as the event information.

According to the information management device (3), the event is classified on the basis of the degree of abnormality and the degree of divergence, and the information in which the degree of abnormality and the degree of divergence are associated for each classified event is generated as the event information. Therefore, it is possible to classify the event finely in accordance with a relationship between the operation behavior of the worker and the change in the data regarding the equipment up to the occurrence of the event. The maintenance information can be managed in association with each classified event. Consequently, in a case where the event occurs during an operation of the equipment, it is possible to assist with appropriate and efficient maintenance work in which the operation behavior of the worker and a change status of the data regarding the equipment are taken into consideration, by using the maintenance information.

In any one of the information management devices (1) to (3), the information management device (4) related to the present disclosure further includes a first label setting unit that sets a first label for identifying each piece of the event information generated by the event information generation unit.

According to the information management device (4), the first label can be set for each piece of the event information, that is, for each classified event by the first label setting unit, and thus it is possible to efficiently manage the event information by using the first label.

According to the information management device (5) related to the present disclosure, in any one of the information management devices (1) to (4), the second data includes history data of at least one of setting data and measured data for the equipment encompassing before and after the maintenance work as the data regarding the equipment, and includes one or more pieces of maintenance work process data included in the maintenance work as the maintenance behavior data. The history data and each piece of the maintenance work process data corresponding to the history data are stored in the second data storage unit in association with each other.

According to the information management device (5), the history data and each piece of the maintenance work process data corresponding to the history data are stored as the second data in the second data storage unit in association with each other. The information in which the history data and each piece of maintenance work process data corresponding to the history data are associated with each piece of the event information (each classified event) is generated as the maintenance information by the maintenance information generation unit. Therefore, the information in which the history data and each piece of maintenance work process data corresponding to the history data are associated for each classified event can be managed as the maintenance information. Consequently, in a case where the event occurs during an operation of the equipment, it is possible to output work process information corresponding to the event and thus to assist with appropriate and efficient maintenance work.

According to the information management device (6) related to the present disclosure, in any one of the information management devices (1) to (4), the second data includes history data of at least one of setting data and measured data for the equipment encompassing before and after the maintenance work as the data regarding the equipment, and includes maintenance moving image data of a maintenance person as the maintenance behavior data. The history data and the maintenance moving image data corresponding to the history data are stored in the second data storage unit in association with each other.

According to the information management device (6), the history data and the maintenance moving image data corresponding to the history data are stored as the second data in the second data storage unit in association with each other. The information in which the history data and the maintenance moving image data corresponding to the history data are associated with each piece of the event information (each classified event) is generated as the maintenance information by the maintenance information generation unit. Therefore, the information in which the history data and the maintenance moving image data corresponding to the history data are associated for each classified event can be managed as the maintenance information. Consequently, in a case where the event occurs during an operation of the equipment, it is possible to output maintenance moving image information corresponding to the event and thus to assist with appropriate and efficient maintenance work.

According to the information management device (7) related to the present disclosure, in any one of the information management devices (1) to (4), the second data includes history data of at least one of setting data and measured data for the equipment encompassing before and after the maintenance work as the data regarding the equipment, and includes operation transition data for an operation part operated by a maintenance person as the maintenance behavior data. The history data and the operation transition data corresponding to the history data are stored in the second data storage unit in association with each other.

According to the information management device (7), the history data and the operation transition data corresponding to the history data are stored as the second data in the second data storage unit in association with each other. The information in which the history data and the operation transition data corresponding to the history data are associated with each piece of the event information (each classified event) is generated as the maintenance information by the maintenance information generation unit. Therefore, the information in which the history data and the operation transition data corresponding to the history data are associated for each classified event can be managed as the maintenance information. Consequently, in a case where the event occurs during an operation of the equipment, it is possible to output information (for example, operation screen transition information) indicating operation transition in the operation part, corresponding to the event, and thus to assist with appropriate and efficient maintenance work.

In any one of the information management devices (1) to (7), the information management device (8) related to the present disclosure further includes a second label setting unit that sets a second label for identifying the maintenance information which corresponds to each piece of the event information and is generated by the maintenance information generation unit.

According to the information management device (8), the second label can be set for the maintenance information corresponding to each piece of the event information by the second label setting unit, and thus it is possible to efficiently manage the maintenance information corresponding to each piece of the event information by using the second label.

In any one of the information management devices (1) to (8), the information management device (9) related to the present disclosure further includes: an event detection unit that detects the occurrence of the event in the equipment; a similar event estimation unit that estimates a similar event from among pieces of the event information generated by the event information generation unit in a case where the event is detected by the event detection unit; a maintenance candidate selection unit that selects a maintenance work candidate corresponding to the similar event estimated by the similar event estimation unit from among pieces of the maintenance information stored in the maintenance information storage unit; and a maintenance information output unit that outputs information regarding the maintenance work candidate selected by the maintenance candidate selection unit.

According to the information management device (9), in a case where the event is detected, the similar event that is similar to the detected event is estimated among the pieces of event information (that is, among the classified events) generated by the event information generation unit, and thus it is possible to estimate the detected event with high accuracy. The maintenance work candidate corresponding to the similar event is selected from among the pieces of maintenance information stored in the maintenance information storage unit, and information regarding the maintenance work candidate is output. Therefore, it is possible to assist with appropriate and efficient maintenance work with respect to the detected event.

According to the information management device (10) related to the present disclosure, in the information management device (9), the similar event estimation unit estimates the similar event on the basis of at least one of the data regarding the equipment and the operation behavior data for the equipment up to the occurrence of the event detected by the event detection unit, and the event information generated by the event information generation unit.

According to the information management device (10), it is possible to further increase the estimation accuracy of the similar event in the similar event estimation unit.

In the information management device (9) or (10), the information management device (11) related to the present disclosure further includes a storage processing unit that stores the event detected by the event detection unit and the first data into the first data storage unit in a case where the similar event has not been able to be estimated by the similar event estimation unit.

According to the information management device (11), in a case where the similar event has not been able to be estimated by the similar event estimation unit, the detected event and the first data are stored in the first data storage unit. Therefore, it is possible to accumulate information for generating the event information and thus to increase the accuracy of the maintenance information.

According to the present disclosure, there is provided an information management method (1) of managing information for assisting with maintenance corresponding to an event having occurred in equipment, the information management method including: a first storage step of storing into a first data storage unit first data relating to at least one of data regarding the equipment and operation behavior data for the equipment up to occurrence of the event; an event information generation step of classifying the event on the basis of the first data stored in the first data storage unit, and generating event information associated with the first data; a second storage step of storing into a second data storage unit second data in which data regarding the equipment and maintenance behavior data for the equipment encompassing before and after maintenance work corresponding to the event are associated with each other; a maintenance information generation step of generating maintenance information corresponding to each piece of the event information by associating the event information generated in the event information generation step with the second data stored in the second data storage unit; and a maintenance information storage step of storing into a maintenance information storage unit the maintenance information which corresponds to each piece of the event information and is generated in the maintenance information generation step.

According to the information management method (1), the event and the first data up to the occurrence of the event are associated with each other in the event information generation step, and thus it is possible to classify the event finely on the basis of the data regarding the equipment or the operation behavior data for the equipment up to the occurrence of the event. The event information and the second data are associated with each other in the maintenance information generation step such that the maintenance information corresponding to each piece of the event information (each classified event) is generated. Therefore, the maintenance information can be managed in association with each piece of the event information (each classified event). Consequently, in a case where the event occurs during an operation of the equipment, it is possible to assist with appropriate and efficient maintenance work in which a status up to the occurrence of the event is taken into consideration, by using the maintenance information.

In the information management method (1), the information management method (2) related to the present disclosure further includes: an event detection step of detecting the occurrence of the event in the equipment; a similar event estimation step of estimating a similar event from among pieces of the event information generated in the event information generation step in a case where the event is detected in the event detection step; a maintenance candidate selection step of selecting a maintenance work candidate corresponding to the similar event estimated in the similar event estimation step from among pieces of the maintenance information stored in the maintenance information storage unit; and a maintenance information output step of outputting information regarding the maintenance work candidate selected in the maintenance candidate selection step.

According to the information management method (2), in a case where the event is detected, the similar event that is similar to the detected event is estimated among the pieces of event information (that is, among the classified events) generated in the event information generation step, and thus it is possible to estimate the detected event with high accuracy. The maintenance work candidate corresponding to the similar event is selected from among the pieces of maintenance information stored in the maintenance information storage unit, and information regarding the maintenance work candidate is output. Therefore, it is possible to assist with appropriate and efficient maintenance work with respect to the detected event.

According to the information management method (3) related to the present disclosure, in the information management method (2), in the similar event estimation step, the similar event is estimated on the basis of at least one of the data regarding the equipment and the operation behavior data for the equipment up to the occurrence of the event detected in the event detection step, and the event information generated in the event information generation step.

According to the information management method (3), it is possible to further increase the estimation accuracy of the similar event in the similar event estimation step.

BRIEF DESCRIPTION OF THE DRAWINGS

FIG. 7 is a diagram illustrating a data configuration example of the event information generated by the event information generation unit in the operation example 2.

FIG. 9 is a diagram illustrating a configuration example 1 of second data stored in a second data storage unit in the maintenance work example illustrated in FIG. 8.

FIG. 10 is a diagram illustrating a configuration example 2 of the second data stored in the second data storage unit.

FIG. 11 is a diagram illustrating a configuration example 3 of the second data stored in the second data storage unit.

FIG. 12 is a diagram illustrating a data configuration example of maintenance information stored in a maintenance information storage unit.

DESCRIPTION OF THE EMBODIMENTS

Hereinafter, an information management device and an information management method according to an embodiment of the present invention will be described with reference to the drawings.

Application Example

Figure 1:
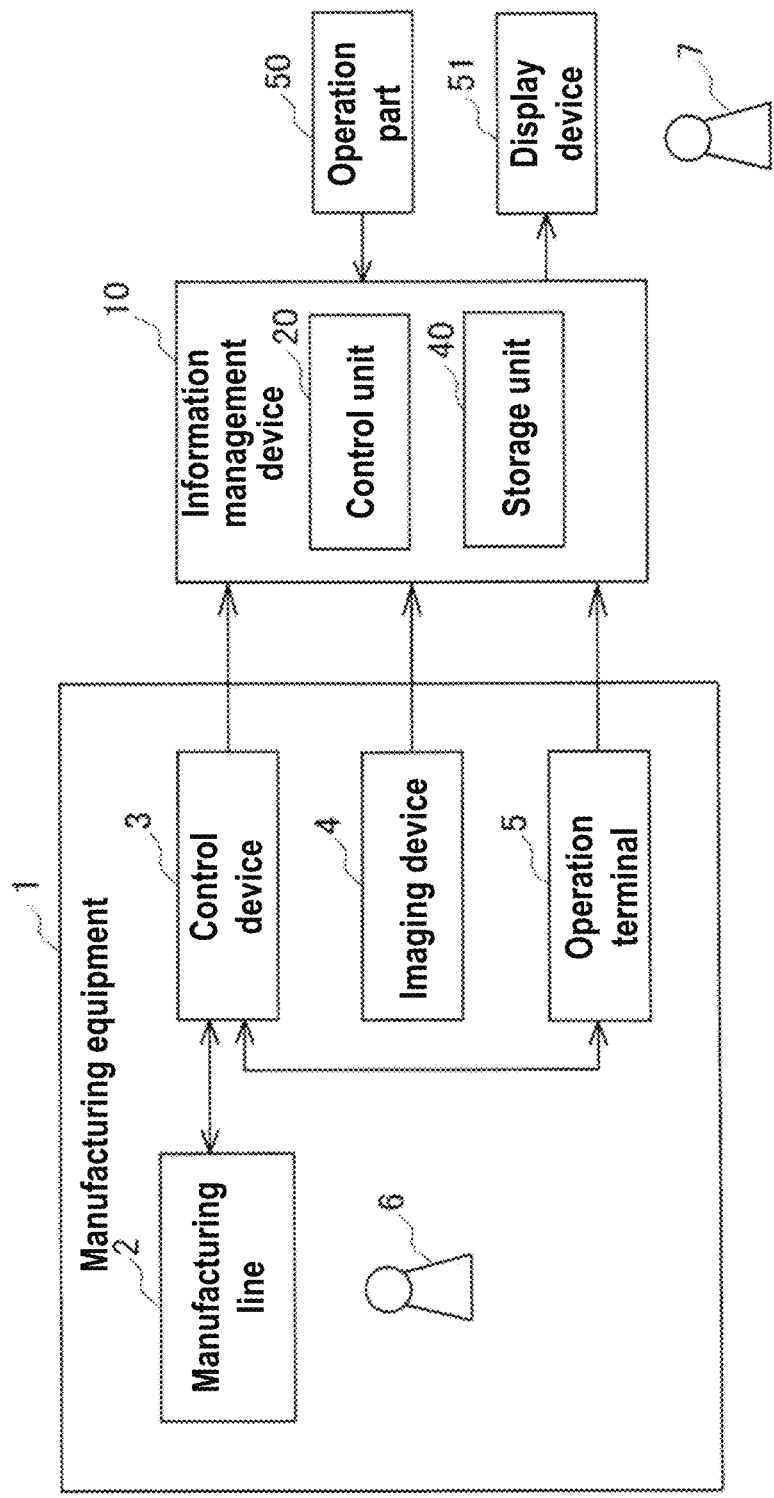
FIG. 1 is a schematic block diagram illustrating an example in which an information management device according to an embodiment is applied to manufacturing equipment.

FIG. 1 is a schematic block diagram illustrating an example in which an information management device according to an embodiment is applied to manufacturing equipment.

An information management device 10 according to the embodiment is a device that manages information for assisting with maintenance corresponding to an event having occurred in equipment. The event in the present embodiment is an event requiring maintenance of equipment, such as an error or a defect that may influence an operation of the equipment. The information management device 10 may be applied to a manufacturing line including equipment that manufactures, produces, or transports various products, components, or articles, or a system including the equipment or the manufacturing line. In the following embodiment, a description will be made of an example in which the information management device 10 is applied to a system including manufacturing equipment 1.

The manufacturing equipment 1 is configured to include a manufacturing line 2, a control device 3, an imaging device 4, and an operation terminal 5. The manufacturing line 2 is configured to include one or more devices manufacturing a predetermined product. A manufactured product is not particularly limited, and may be an electrical product, a mechanical product, a component thereof, food, or medicine.

The control device 3 is configured to include one or more controllers controlling an operation or the like of each device configuring the manufacturing line 2, and may employ, for example, a programmable logic controller (PLC). The imaging device 4 is a device imaging an operation behavior of a worker 6 who performs work in the manufacturing line 2, and is configured to include, for example, one or more cameras that can capture moving images.

The operation terminal 5 is a device that is connected to the control device 3, and displays information or the like regarding each device configuring the manufacturing line 2 or allows an operation of inputting a setting value or the like to the control device 3 via an operation panel (not illustrated), and may employ, for example, a programmable terminal (PT) provided with a human machine interface (HMI).

The information management device 10 is a device that performs information management for enabling even an inexperienced maintenance person to perform appropriate and efficient maintenance work without waste as in a case where an experienced maintenance person performs the maintenance work, and is configured to include not only a control unit 20 and a storage unit 40 but also an interface device or the like used for connection to external devices, as a hardware configuration.

The information management device 10 is connected to the control device 3, the imaging device 4, and the operation terminal 5 provided in the manufacturing equipment 1 in a wired or wireless manner, and may acquire data from each device. An operation part 50 and a display device 51 are connected to the information management device 10, and a data input operation or various setting operations may be performed on the information management device 10 via the operation part 50. The information management device 10 may display various pieces of information such as maintenance information, setting screens, or the like via the display device 51. The information management device 10 may be configured separately from the operation part 50 and the display device 51, and may be configured integrally therewith.

The control unit 20 is configured with one or more computers each including a central processing unit (CPU), a random access memory (RAM), and a read only memory (ROM). The control unit 20 stores various pieces of data acquired from the control device 3, the imaging device 4, or the operation terminal 5 into the storage unit 40, reads and analyzes a program stored in the ROM of the control unit 20, and executes the program.

The storage unit 40 is configured to include one or more storage devices, for example, semiconductor memories such as nonvolatile memories or volatile memories, hard disk drives (HDDs), or solid state drives (SSDs). A specific configuration of the information management device 10 will be described below.

Figure 2:
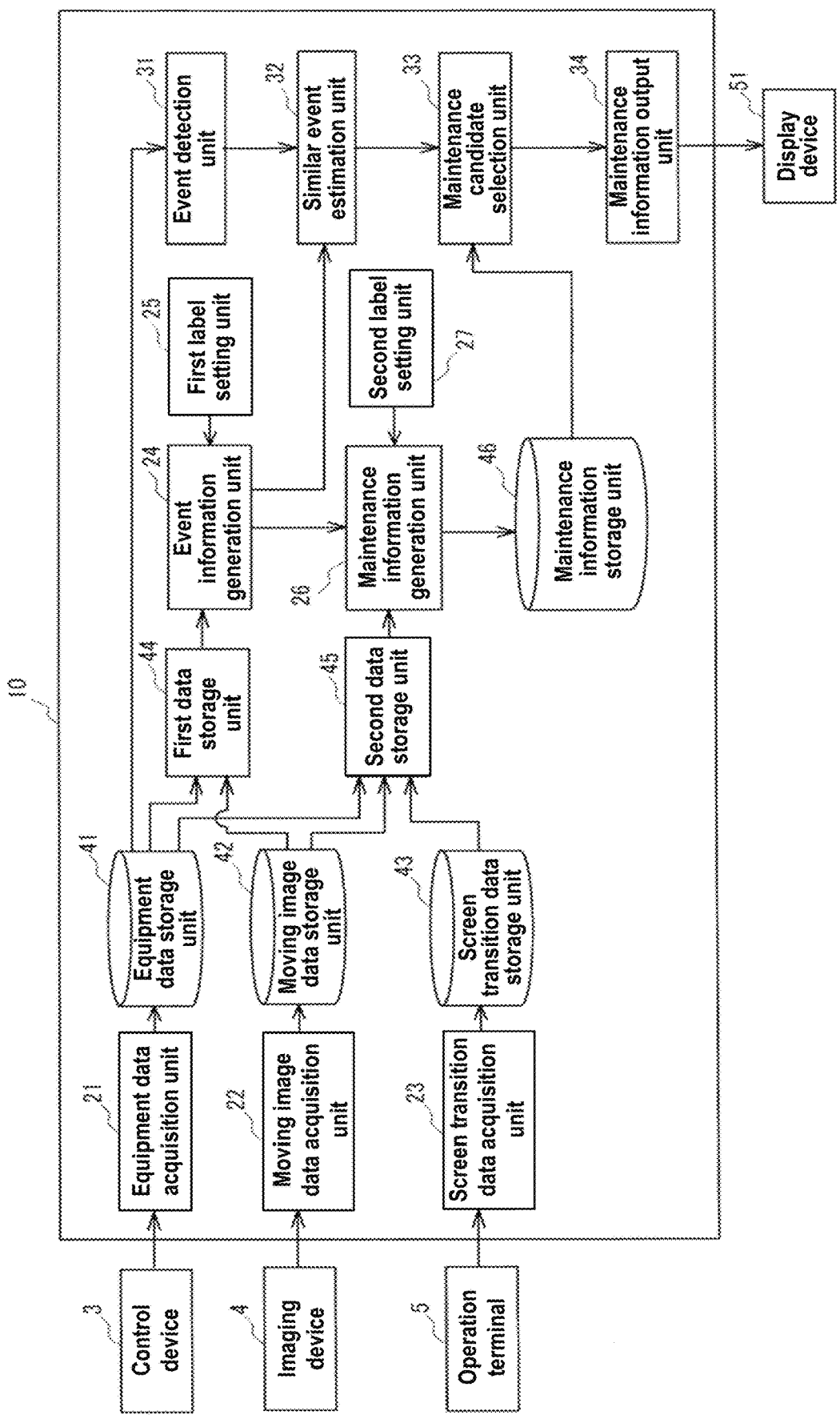
FIG. 2 is a block diagram illustrating a functional configuration example of the information management device according to the embodiment.

FIG. 2 is a block diagram illustrating a functional configuration example of the information management device 10 according to the embodiment.

The information management device 10 has functions as an equipment data acquisition unit 21, a moving image data acquisition unit 22, a screen transition data acquisition unit 23, an event information generation unit 24, a first label setting unit 25, a maintenance information generation unit 26, a second label setting unit 27, an event detection unit 31, a similar event estimation unit 32, a maintenance candidate selection unit 33, and a maintenance information output unit 34. These functions are realized by the CPU reading and executing programs stored in the ROM of the control unit 20. The functions may be executed by a plurality of control units 20 through distributed processing, and some of the functions may be executed by a server computer on a network.

The information management device 10 has functions as an equipment data storage unit 41, a moving image data storage unit 42, a screen transition data storage unit 43, a first data storage unit 44, a second data storage unit 45, and a maintenance information storage unit 46. These functions are realized by the storage unit 40. Some of the functions may be configured with a storage device on a network.

The equipment data acquisition unit 21 acquires data regarding equipment configuring the manufacturing line 2 from the control device 3 during an operation of the manufacturing line 2, and stores the data into the equipment data storage unit 41. The equipment data acquisition unit 21 acquires data regarding the equipment configuring the manufacturing line 2 from the control device 3 during maintenance work for the manufacturing line 2, and stores the data into the equipment data storage unit 41. The equipment data includes data relating to at least one of setting data that is input to the control device 3 and measured data that is measured in the manufacturing line 2. The measured data may include not only measured values from various measurement devices provided in the manufacturing line 2 but also data such as a feature amount calculated from a measured value or a feature amount of a measurement object such as a manufactured product.

The moving image data acquisition unit 22 acquires work moving image data of the worker 6 captured by the imaging device 4 during the operation of the manufacturing line 2, and stores the work moving image data into the moving image data storage unit 42. The moving image data acquisition unit 22 acquires maintenance moving image data of a maintenance person 7 captured by the imaging device 4 during maintenance work for the manufacturing line 2, and stores the maintenance moving image data into the moving image data storage unit 42.

The screen transition data acquisition unit 23 acquires screen transition data (operation transition data) of the operation terminal 5 operated by the worker 6 during the operation of the manufacturing line 2, and stores the screen transition data into the screen transition data storage unit 43. The screen transition data acquisition unit 23 acquires screen transition data of the operation terminal 5 operated by the maintenance person 7 during the maintenance work for the manufacturing line 2, and stores the screen transition data into the screen transition data storage unit 43.

The first data storage unit 44 stores equipment data up to the occurrence of an event, acquired from the control device 3 during the operation of the manufacturing line 2 among the pieces of equipment data stored in the equipment data storage unit 41. The event refers to an event such as an error or a defect occurring during the operation of the manufacturing line 2, requiring subsequent maintenance work such as an inspection or repair.

The first data storage unit 44 stores work moving image data of the worker 6 up to the occurrence of an event, captured by the imaging device 4 during the operation of the manufacturing line 2 among the pieces of work moving image data stored in the moving image data storage unit 42. The first data storage unit 44 may store screen transition data for the operation terminal 5 operated by the worker 6 during the operation of the manufacturing line 2 up to the occurrence of an event among the pieces of screen transition data stored in the screen transition data storage unit 43.

As mentioned above, the first data storage unit 44 stores data (referred to as first data) relating to at least any of the equipment data, the work moving image data, and the screen transition data up to the occurrence of an event.

The second data storage unit 45 stores equipment data encompassing before and after maintenance work, acquired from the control device 3 during the maintenance work for the manufacturing line 2 among the pieces of equipment data stored in the equipment data storage unit 41.

The second data storage unit 45 stores maintenance moving image data of the maintenance person 7 encompassing before and after maintenance work, captured by the imaging device 4 during the maintenance work for the manufacturing line 2 among the pieces of work moving image data stored in the moving image data storage unit 42. The second data storage unit 45 stores screen transition data of the operation terminal 5 operated by the maintenance person 7 during the maintenance work for the manufacturing line 2 among the pieces of screen transition data stored in the screen transition data storage unit 43.

As mentioned above, the second data storage unit 45 stores data (referred to as second data) in which the equipment data encompassing before and after maintenance work corresponding to an event occurring in the manufacturing line 2 is associated with maintenance behavior data (at least one of the maintenance moving image data and the screen transition data).

The event information generation unit 24 classifies the event on the basis of the first data stored in the first data storage unit 44, and generates event information in which the classified event (i.e., an event which has been classified) is associated with the first data. An operation example performed by the event information generation unit 24 will be described later.

The first label setting unit 25 sets a first label for identifying each piece of event information (that is, the classified event) generated by the event information generation unit 24. Regarding the setting of the first label, the maintenance person 7 may set an identification label for a classified event via the operation part 50, or an identification label may be automatically set for a classified event.

The maintenance information generation unit 26 generates maintenance information corresponding to each piece of event information (that is, each classified event) by associating the event information generated by the event information generation unit 24 with the second data stored in the second data storage unit 45. An operation example performed by the maintenance information generation unit 26 will be described later.

The second label setting unit 27 sets a second label for identifying the maintenance information generated by the maintenance information generation unit 26, corresponding to each piece of event information. Regarding the setting of the second label, the maintenance person 7 may set an identification label for maintenance information associated with a classified event via the operation part 50, or an identification label may be automatically set for maintenance information associated with a classified event.

The event detection unit 31 detects that an event has occurred in the manufacturing line 2 on the basis of, for example, equipment data acquired from the control device 3 during the operation of the manufacturing line 2.

In a case where the event has been detected by the event detection unit 31, the similar event estimation unit 32 estimates a similar event that is similar to (that is, the same as or most similar to) the detected event from among pieces of event information generated by the event information generation unit 24. The similar event estimation unit 32 collates, for example, at least one of equipment data up to the occurrence of the event detected by the event detection unit 31 and operation behavior data (work moving image data) for the equipment with the event information generated by the event information generation unit 24, to estimate the similar event that is similar to the detected event.

In a case where the similar event corresponding to the detected event has not been able to be estimated among the pieces of event information by the similar event estimation unit 32, the present detected event and the first data up to the occurrence of the detected event may be stored into the first data storage unit 44, and new event information may be generated.

The maintenance candidate selection unit 33 selects a maintenance work candidate corresponding to the similar event estimated by the similar event estimation unit 32 from among the pieces of maintenance information stored in the maintenance information storage unit 46.

The maintenance information output unit 34 outputs information regarding the maintenance work candidate selected by the maintenance candidate selection unit 33 to the display device 51, and thus information regarding maintenance work corresponding to the detected event is displayed on a screen of the display device 51.

Operation Examples

Next, a description will be made of an operation example 1 performed by the event information generation unit 24. In the operation example 1, a description will be made of a case where data relating to an error route in a control flow for the manufacturing line 2 up to the occurrence of an event as equipment data is included in the first data stored in the first data storage unit 44.

Figure 3:
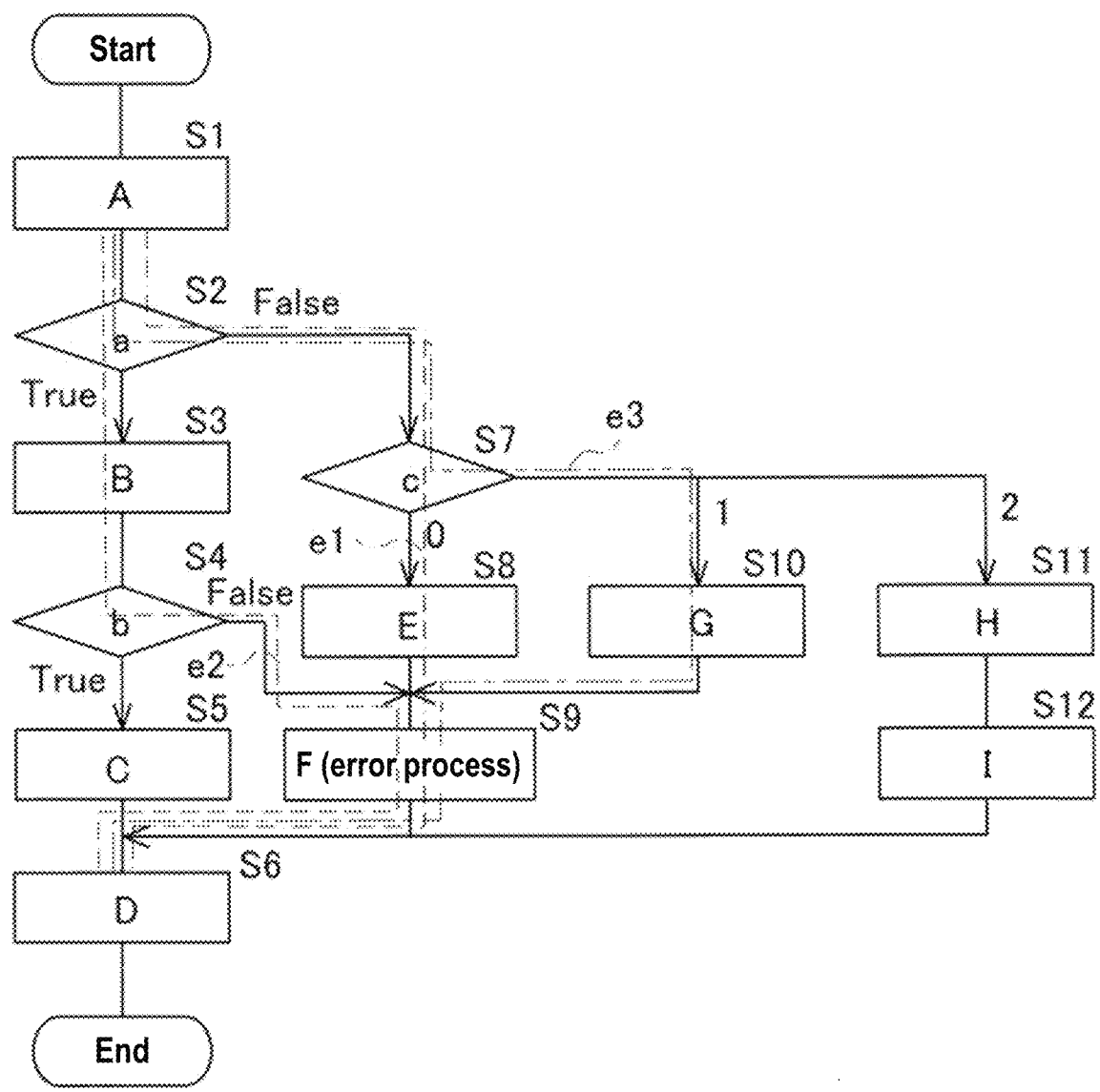
FIG. 3 is a control flow for describing first data stored in a first data storage unit.

FIG. 3 is a control flow for describing the first data (a part of the control flow for the manufacturing line 2 executed by the control device 3) stored in the first data storage unit 44. In the present control flow, in step S9, an error process F is executed. In this example, the error process F is an event.

First, during normal times, the control device 3 executes the control flow along a route including steps S1, S2 (true), S3, S4 (true), S5, and S6. In other words, the control device 3 performs a process A in step S1, and determines a condition a in the next step S2. In a case where the condition a is established (true) in step S2, the control device 3 proceeds to step S3 to perform a process B, and determines a condition b in the next step S4. In a case where the condition b is established (true) in step S4, the control device 3 proceeds to step S5 to perform a process C, then proceeds to step S6 to perform a process D, and then finishes the process.

There are three error routes leading to the error process F (event) in the control flow illustrated in FIG. 3.

An error route e1 is a route including steps S1, S2 (false), S7 (determination value=0), S8, S9 (error process F), and S6. In other words, in the error route e1, the control device 3 performs the process A in step S1, proceeds to step S2 to determine that the condition a is not established (false), and then proceeds to step S7 to determine the condition c. The control device 3 determines that a determination value for the condition c is 0 in step S7, then proceeds to step S8 to perform the process E, and then proceeds to step S9. The control device 3 performs the error process F in step S9, then proceeds to step S6 to perform the process D, and then finishes the process.

In the error route e1, the route from step S2 (false) to step S6 via steps S7, S8, and S9 is different from the route during the normal times. In a case where control related to the error route e1 is performed by the control device 3, the error process F that is the event and information (that is, the data regarding the route including steps S1, S2 (false), S7 (determination value=0), S8, S9 (error process F), and S6, and the determination values in steps S2 and S7) regarding the error route e1 are stored in the first data storage unit 44 in association with each other.

An error route e2 is a route including steps S1, S2 (true), S3, S4 (false), S9 (error process F), and S6. In other words, in the error route e2, the control device 3 performs the processes in steps S1 to S3, proceeds to step S4 to determine that the condition b is not established (false), and then proceeds to step S9. The control device 3 performs the error process F in step S9, then proceeds to step S6 to perform the process D, and then finishes the process.

In the error route e2, the route from step S4 (false) to step S6 via step S9 is different from the route during the normal times. In a case where control related to the error route e2 is performed by the control device 3, the error process F that is the event and information (that is, the data regarding the route including steps S1, S2 (true), S3, S4 (false), S9 (error process F), and S6, and the determination values in steps S2 and S4) regarding the error route e2 are stored in the first data storage unit 44 in association with each other.

An error route e3 is a route including steps S1, S2 (false), S7 (determination value=1), S10, S9 (error process F), and S6. In other words, in the error route e3, the control device 3 performs the process A in step S1, proceeds to step S2 to determine that the condition a is not established (false), and then proceeds to step S7 to determine the condition c. The control device 3 determines that a determination value for the condition c is 1 in step S7, then proceeds to step S10 to perform a process G, and then proceeds to step S9. The control device 3 performs the error process F in step S9, then proceeds to step S6 to perform the process D, and then finishes the process.

In the error route e3, the route from step S2 (false) to step S6 via steps S7, S10, and S9 is different from the route during the normal times. In a case where control related to the error route e3 is performed by the control device 3, the error process F that is the event and information (that is, the data regarding the route including steps S1, S2 (false), S7 (determination value=1), S10, S9 (error process F), and S6, and the determination values in steps S2 and S7) regarding the error route e3 are stored in the first data storage unit 44 in association with each other. The error route information may include at least information regarding a route portion that is different from the route during the normal times.

The event information generation unit 24 classifies an event on the basis of data relating to the error route stored in the first data storage unit 44, and generates information associated with the data relating to the error route for each classified event as event information. In the operation example 1, the event (error process F) is classified into three types on the basis of the error routes e1, e2, and e3.

Figures 4, 5:
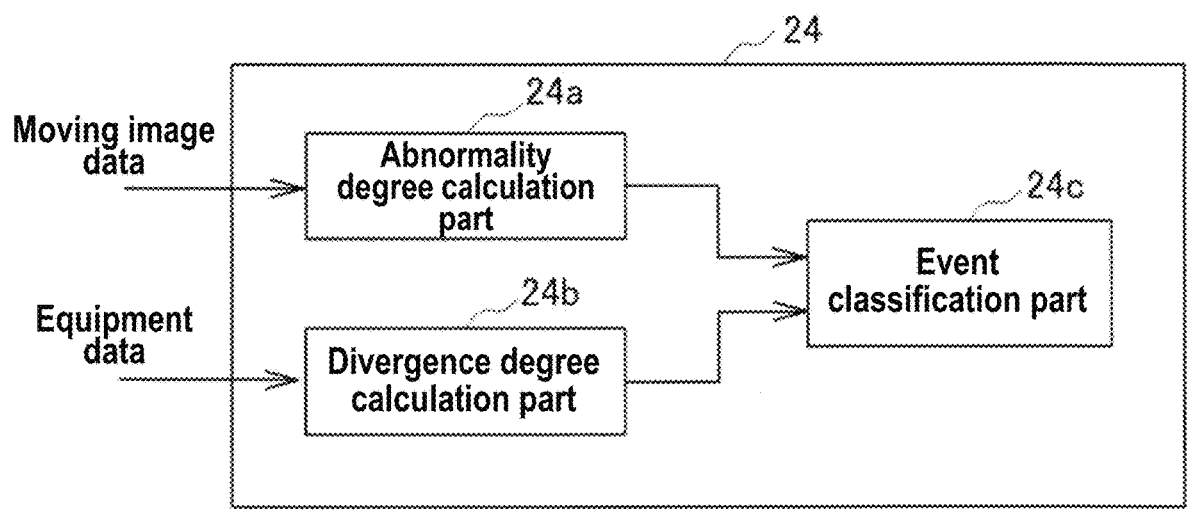
FIG. 4 is a diagram illustrating a data configuration example of event information generated by an event information generation unit in an operation example 1.
FIG. 5 is a block diagram illustrating a functional configuration example of the event information generation unit performing an operation example 2.

FIG. 4 is a diagram illustrating a data configuration example of the event information generated by the event information generation unit 24 in the operation example 1. The event information includes an event, first data, and a first label as data items.

The event item stores the error process F in Nos. 1 to 3, and the first data item stores the pieces of information regarding the error route e1, the error route e2, and the error route e3 in association with (in other words, in a linked form) the error process F in Nos. 1 to 3. As described above, association with not only the error process F in the control flow but also the routes leading to the error process F is performed, and thus contents of the error process F that is an event can be classified in detail.

Label information for identifying the event is set in the first label item. Regarding setting of the first label, the maintenance person 7 may set label information for each classified event via the operation part 50, or the control unit 20 may execute a process of automatically setting label information for each classified event.

Next, a description will be made of an operation example 2 performed by the event information generation unit 24. In the operation example 2, a description will be made of a case where data relating to at least one of setting data and measured data for equipment as equipment data and work moving image data of the worker 6 as operation behavior data for the equipment are included in the first data stored in the first data storage unit 44.

Figure 6:
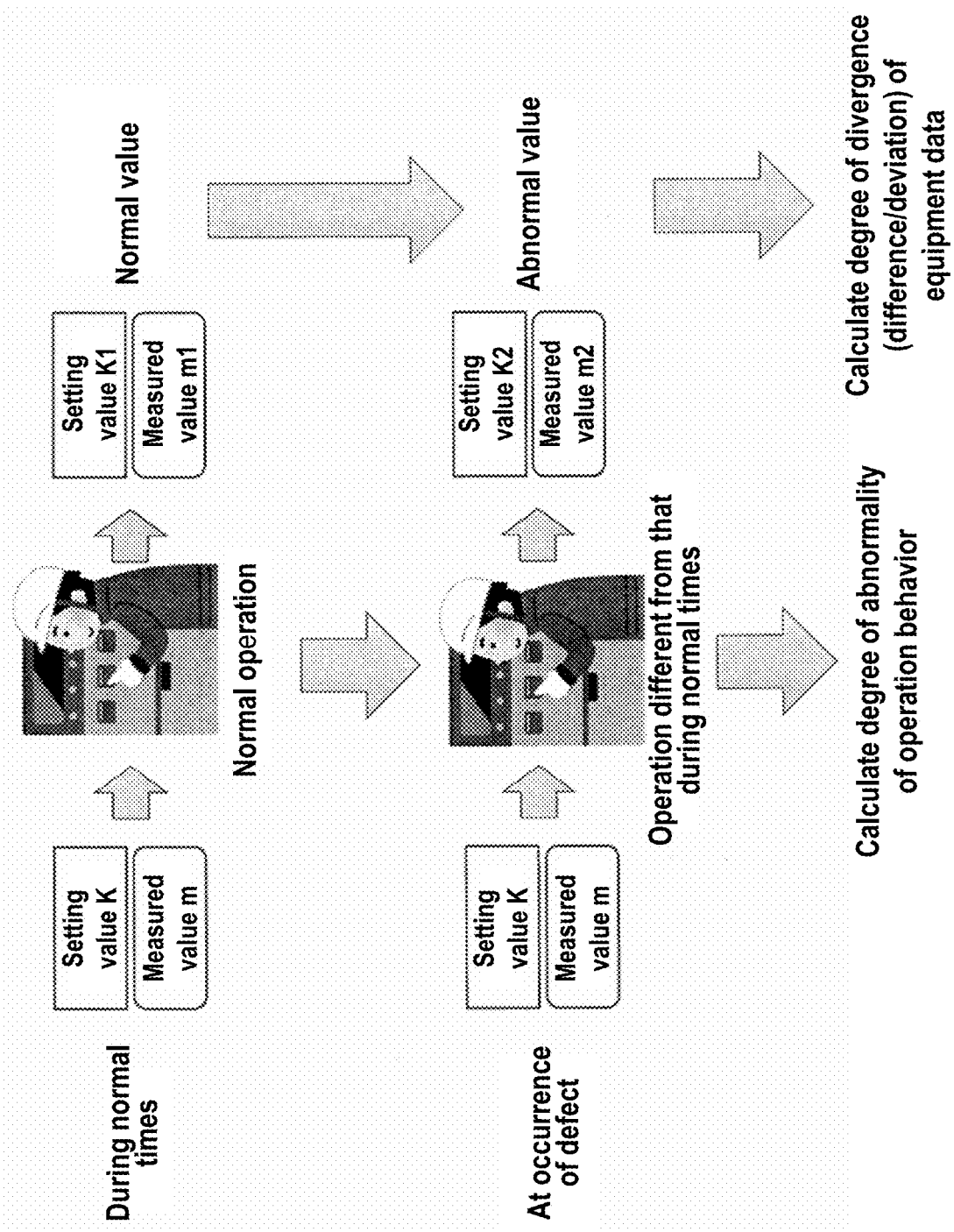
FIG. 6 is a diagram for describing the operation example 2 performed when a defect occurs.

FIG. 5 is a block diagram illustrating a functional configuration example of the event information generation unit 24 performing the operation example 2. FIG. 6 is a diagram for describing the operation example 2 performed when a defect occurs.

As illustrated in FIG. 5, the event information generation unit 24 is configured to include an abnormality degree calculation part 24a, a divergence degree calculation part 24b, and an event classification part 24c.

The abnormality degree calculation part 24a calculates the degree of abnormality with respect to a normal operation behavior on the basis of work moving image data of the worker 6 in a case where a defect as an event occurs. The degree of abnormality may be a determination value (that is, a determination value for the presence or absence of abnormality) indicating whether or not an operation behavior different from the normal operation behavior has been detected, may be calculated on the basis of a weight of a detected operation behavior by adding the weight to a content of an operation behavior different from the normal operation behavior in advance, may be calculated on the basis of the number of operation behaviors different from the normal operation behavior, or may be calculated on the basis of a time at which an operation behavior different from the normal operation behavior is performed.

The divergence degree calculation part 24b calculates the degree of divergence from a normal value on the basis of a change in equipment data (at least one of setting data and measured data) in a case where a defect occurs. As the degree of divergence, as illustrated in FIG. 6, for example, a difference or a deviation between equipment data (a setting value K1 and a measured value m1) after a normal operation behavior is performed and equipment data (a setting value K2 and a measured value m2) after an operation behavior different from the normal operation behavior is performed is calculated.

The event classification part 24c classifies an event on the basis of the degree of abnormality of the operation behavior calculated by the abnormality degree calculation part 24a and the degree of divergence of the equipment data calculated by the divergence degree calculation part 24b, and generates, as event information, information in which each classified event is associated with the degree of abnormality and the degree of divergence.

FIG. 7 is a diagram illustrating a data configuration example of the event information generated by the event information generation unit 24 in the operation example 2. The event information includes an event, first data, and a first label as data items.

The event item stores defect codes (in FIG. 7, a defect F1 is stored in Nos. 1 and 2, and a defect F2 is stored in Nos. 3 and 4), and the first data item stores information regarding the degree of abnormality of an operation behavior and the degree of divergence of equipment data in association with (in other words, in a linked form) each defect code. In the example illustrated in FIG. 7, two events different in the degree of abnormality and the degree of divergence are classified and stored with respect to the same defect code (the defects F1 and F2). Even when a defect code (that is, an event) is the same, an operation behavior of the worker 6 during the occurrence of the defect and equipment data may differ. As described above, association with not only the defect code but also the degree of abnormality and the degree of divergence is performed, and thus each of the defects F1 and F2 that are events can be classified in detail.

Label information for identifying the event is set in the first label item. Regarding setting of the first label, the maintenance person 7 may set label information for each classified event via the operation part 50, or the control unit 20 may perform a process of automatically setting label information for each classified event.

The same first label is set for the event information in the operation example 1 described with reference to FIG. 4 and the event information in the operation example 2 described with reference to FIG. 7, which can thus be associated with each other. For example, the same first label (F003) is set for the event (the error process F and the error route e3) in No. 3 illustrated in FIG. 4 and the event (the defect F2, the degree of abnormality f03, and the degree of divergence (K6−K1)) in No. 4 illustrated in FIG. 7. The same first label is set, and thus the error route in the control flow can be associated with the degree of abnormality of an operation behavior of the worker 6 and the change (degree of divergence) in the equipment data. Such event information is generated, and can thus be usefully used to find a cause such as a defect early.

Next, a description will be made of a configuration example 1 of the second data stored in the second data storage unit 45. In the configuration example 1 of the second data, history data of at least one of setting data and measured data for equipment encompassing before and after maintenance work is included as equipment data, and one or more pieces of maintenance work process data included in the maintenance work are included as maintenance behavior data.

Figure 8:
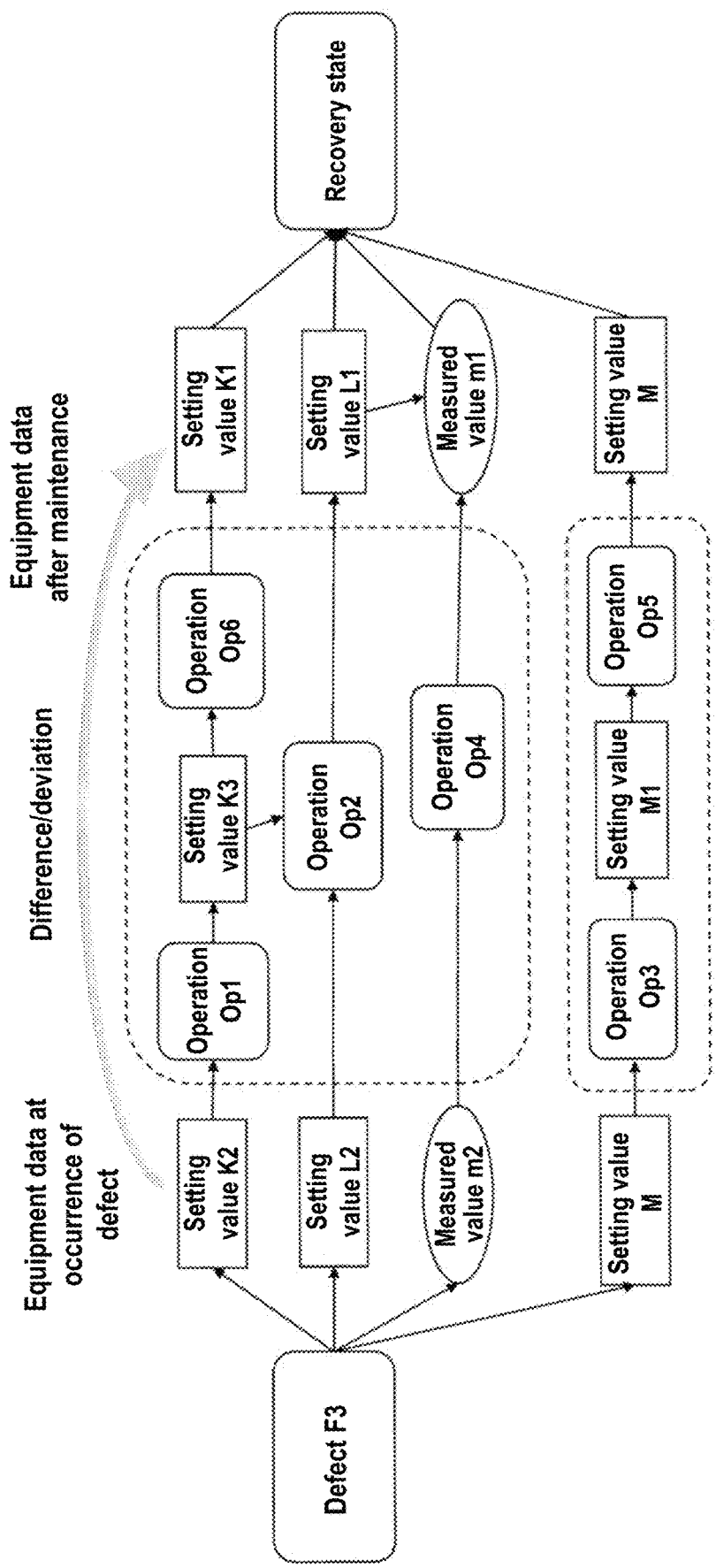
FIG. 8 is a diagram illustrating an example of a relationship between histories of setting data and measured data for equipment and a maintenance work process until a manufacturing line returns to a recovery state after a defect F3 occurs in the manufacturing line.

FIG. 8 illustrates an example of an example of a relationship between histories of setting data and measured data for the equipment and a maintenance work process until the manufacturing line 2 returns to a recovery state after the defect F3 as an event occurs in the manufacturing line 2 and then maintenance work is performed.

In the example illustrated in FIG. 8, work such as an operation Op1 to an operation Op6 is executed until the manufacturing line 2 returns to a recovery state after the defect F3 occurs. In this example, maintenance work such as the operation Op1 to the operation Op6 is not stored simply in a time series, but an operation actually required for recovery from a defect and a history of equipment data involved in the operation are configured to be stored in the second data storage unit 45 in association with each other.

In the example illustrated in FIG. 8, equipment data when the defect F3 occurs (before maintenance work) is a setting value K2, a setting value L2, a measured value m2, and a setting value M, and equipment data after the maintenance work is a setting value K1, a setting value L1, a measured value m1, and the setting value M.

The setting value K2 at the occurrence of the defect is changed to a setting value K3 through the operation Op1, and is then changed to the setting value K1 through the operation Op6. The setting value L2 at the occurrence of the defect is changed to the setting value L1 by performing the operation Op2 after the setting value K2 is changed to the setting value K3. The measured value m2 at the occurrence of the defect is changed to the measured value m1 by performing the operation Op4 after the setting value L2 is changed to the setting value L1.

The setting values K2 and L2 and the measured value m2 at the occurrence of the defect are respectively changed to the setting values K1 and L1 and the measured value m2 indicating the recovery state (that is, have a data difference or deviation indicating the recovery state), and the operation Op1, the operation Op6, the operation Op2, and the operation Op4 are operations required for recovery from the defect.

On the other hand, the setting value M at the occurrence of the defect is changed to a setting value M1 through the operation Op3, and then returns to the setting value M through the operation Op5. In other words, the setting value M is not changed, and the operation Op3 and the operation Op5 are operations that do not contribute to recovery from the defect.

FIG. 9 is a diagram illustrating the configuration example 1 of the second data stored in the second data storage unit 45 in the maintenance work example illustrated in FIG. 8. Data items include an event, history data, and maintenance work process data, and the history data and the maintenance work process data are stored in association with each event.

In the configuration example 1 of the second data illustrated in FIG. 9, the defect F3 is stored in No. 1 as the event, information regarding a setting value (K2−K1), a setting value (L2−L1), and a measured value (m2−m1) is stored as the history data thereof, and information regarding (the operation Op1, the setting value K3, and the operation Op6), (the operation Op1, the setting value K3, and the operation Op2), and (the operation Op4) is stored as the maintenance work process data in association with each piece of history data.

The information regarding the operation Op3 and the operation Op5 for the setting value M is not stored as the second data in this example since the setting value M is not changed (in other words, data having no difference or deviation) after maintenance of the operation Op3 and the operation Op5, which are operations that may be highly possibly performed through trial and error.

Next, a description will be made of a configuration example 2 of the second data stored in the second data storage unit 45. In the configuration example 2 of the second data, history data of at least one of setting data and measured data for equipment encompassing before and after maintenance work is included as equipment data, and maintenance moving image data of the maintenance person 7 is included as maintenance behavior data.

FIG. 10 is a diagram illustrating the configuration example 2 of the second data stored in the second data storage unit 45. Data items include an event, history data, and maintenance moving image data, and the history data and the maintenance moving image data are stored in association with each event.

In the configuration example 2 of the second data illustrated in FIG. 10, as the events, defects F4, F5, and F6 are respectively stored in Nos. 1 to 3, and, as the history data, information regarding a setting value (K12−K1) and a measured value (m4−m1) is stored in association with the defect F4, information regarding a setting value (L4−L1) and a measured value (m6−m1) is stored in association with the defect F5, and information regarding a setting value (M2−M) and a measured value (n2−n1) is stored in association with the defect F6. As the maintenance moving image data, a maintenance moving image M001 is stored in association with the defect F4, a maintenance moving image M002 is stored in association with the defect F5, and a maintenance moving image M003 is stored in association with the defect F6.

Next, a description will be made of a configuration example 3 of the second data stored in the second data storage unit 45. In the configuration example 3 of the second data, history data of at least one of setting data and measured data for equipment encompassing before and after maintenance work is included as equipment data, and operation transition data of the operation terminal 5 operated by the maintenance person 7 is included as maintenance behavior data.

FIG. 11 is a diagram illustrating the configuration example 3 of the second data stored in the second data storage unit 45. Data items include an event, history data, and screen transition data of the operation terminal 5, and the history data and the screen transition data are stored in association with each event.

In the configuration example 3 of the second data illustrated in FIG. 11, as the events, defects F7 and F8 are respectively stored in Nos. 1 and 2, and, as the history data, information in which setting values (M4, N2, P) are changed to setting values (M1, N1, L2) is stored in association with the defect F7. As the screen transition data, transition data of a screen d1 (the screen in which the setting value M4 is changed to M1), a screen d2 (the screen in which the setting value N2 is changed to N1), a screen d3 (the screen in which the setting value L2 is added), and a screen d4 (the screen in which the setting value P is deleted) of the operation terminal 5 is stored. The history data (setting data or measured data) and the screen transition data are also stored in association with the defect F8.

Next, a description will be made of an operation example performed by the maintenance information generation unit 26. The maintenance information generation unit 26 associates the event information (the event information exemplified in FIG. 4 or 7) generated by the event information generation unit 24 with the second data (the second data exemplified in FIG. 9, 10, or 11) stored in the second data storage unit 45, and thus generates maintenance information corresponding to each piece of event information (each classified event). The generated maintenance information is stored into the maintenance information storage unit 46.

FIG. 12 is a diagram illustrating a data configuration example of the maintenance information stored in the maintenance information storage unit 46. In FIG. 12, a description will be made of a case where maintenance information corresponding to each piece of the event information exemplified in FIG. 4 is stored.

Data items include event information, second data, and a second label, and the second data including the maintenance information (that is, the maintenance work production result data, the maintenance moving image data, or the screen transition data) is stored in association with a classified event included in the event information.

In the field of No. 1 in FIG. 12, the event information in No. 1 exemplified in FIG. 4 and the second data in No. 1 exemplified in FIG. 9 are stored in association with each other. In other words, it is defined that the maintenance information corresponding to the event information (that is, the classified event) in No. 1 exemplified in FIG. 4 is the maintenance work process data of the second data in No. 1 exemplified in FIG. 9.

In the field of No. 2 in FIG. 12, the event information in No. 2 exemplified in FIG. 4 and the second data in No. 1 exemplified in FIG. 11 are stored in association with each other. In other words, it is defined that the maintenance information corresponding to the event information (that is, the classified event) in No. 2 exemplified in FIG. 4 is the screen transition data of the second data in No. 1 exemplified in FIG. 11.

In the field of No. 3 in FIG. 12, the event information in No. 3 exemplified in FIG. 4 and the second data in No. 1 exemplified in FIG. 10 are stored in association with each other. In other words, it is defined that the maintenance information corresponding to the event information (that is, the classified event) in No. 3 exemplified in FIG. 4 is the maintenance moving image data of the second data in No. 1 exemplified in FIG. 10.

Label information for identifying maintenance information corresponding to each classified event is set in the second label item. Regarding setting of the second label, the maintenance person 7 may set label information for maintenance information corresponding to each event via the operation part 50, or the control unit 20 may execute a process of automatically setting label information for maintenance information corresponding to each event.

Figure 13:
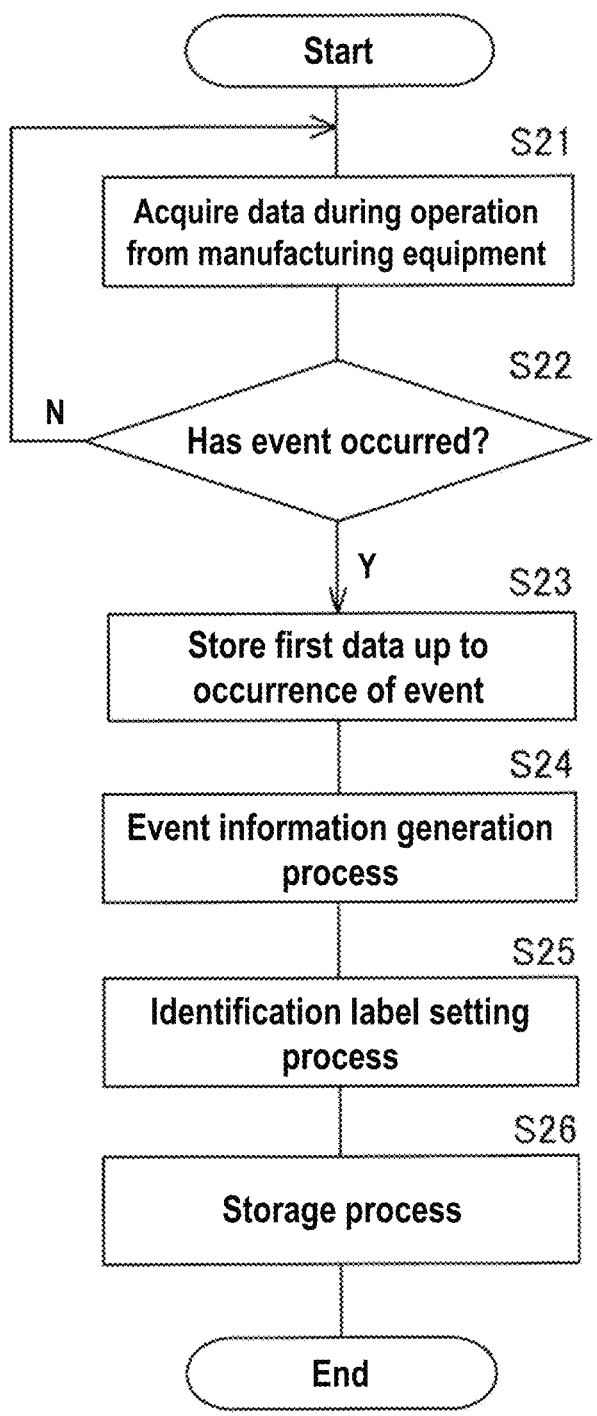
FIG. 13 is a flowchart illustrating a process operation example performed by a control unit configuring the information management device according to the embodiment.

FIG. 13 is a flowchart illustrating a process operation performed by the control unit 20 configuring the information management device 10 according to the embodiment. The present process operation is an event information generation process operation, and is executed, for example, during an operation of the manufacturing line 2.

First, in step S21, the control unit 20 acquires data during the operation from the manufacturing equipment 1, and causes the process to proceed to step S22. For example, the control unit 20 acquires equipment data from the control device 3, stores the equipment data into the equipment data storage unit 41, acquires work moving image data of the worker 6 from the imaging device 4, and stores the work moving image data into the moving image data storage unit 42. Screen transition data may be acquired from the operation terminal 5 to be stored into the screen transition data storage unit 43.

In the next step S22, the control unit 20 determines whether or not an event has occurred during the operation of the manufacturing line 2, and returns to step S21 when it is determined that the event has not occurred, and causes the process to proceed to step S23 when it is determined that the event has occurred. Whether or not the event has occurred may be determined on the basis of, for example, an event detection signal acquired from the control device 3 or the operation terminal 5.

In step S23, the control unit 20 performs a process of storing the first data including at least one of equipment data and the work moving image data up to the occurrence of the event into the first data storage unit 44, and causes the process to proceed to step S24.

In step S24, the control unit 20 performs an event information generation process. In other words, the control unit 20 performs a process of classifying the event on the basis of the first data stored in the first data storage unit 44 and generating, as event information, information in which the classified event is associated with the first data corresponding to the classified event, and causes the process to proceed to step S25.

In step S25, the control unit 20 performs a process of setting a label (first label) for identifying the event information generated in step S24, and, in the next step S26, stores the event information into the storage unit 40 (for example, the first data storage unit 44 or the maintenance information storage unit 46), and then finishes the process.

Figure 14:
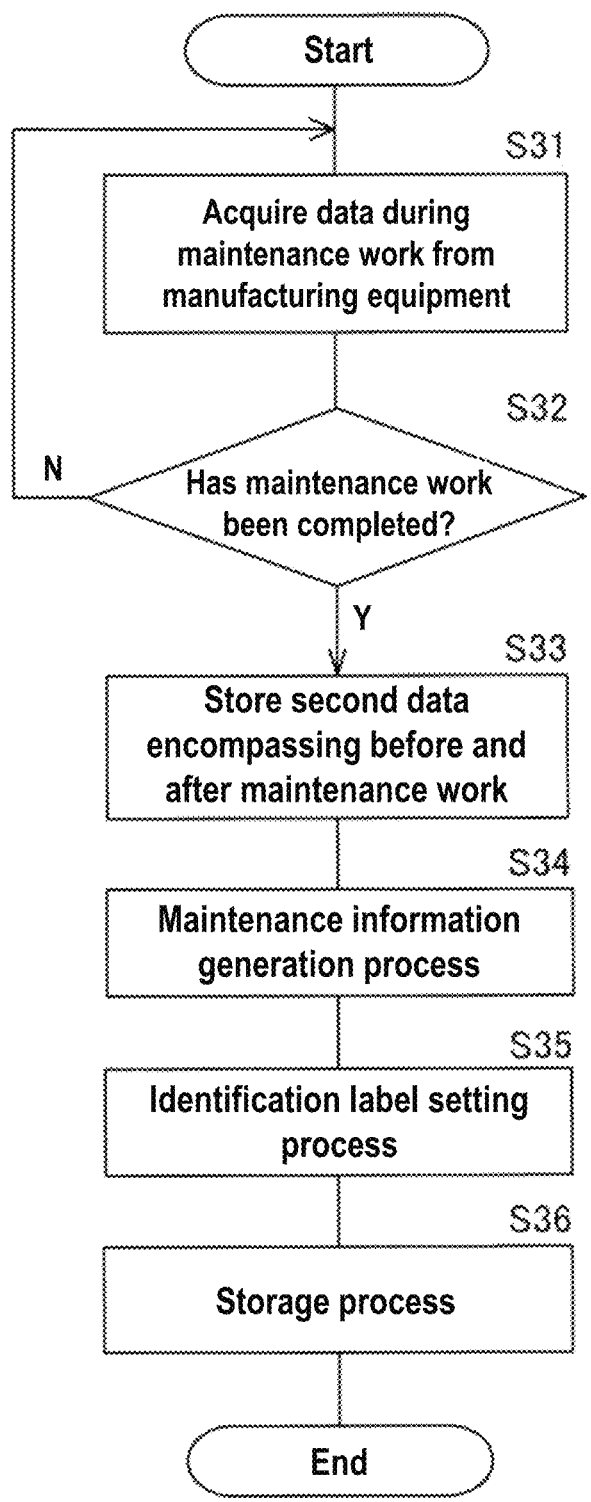
FIG. 14 is a flowchart illustrating a process operation example performed by the control unit configuring the information management device according to the embodiment.

FIG. 14 is a flowchart illustrating a process operation performed by the control unit 20 configuring the information management device 10 according to the embodiment. The present process operation is a maintenance information generation process operation, and is executed, for example, during maintenance work corresponding to an event having occurred in the manufacturing line 2.

First, in step S31, the control unit 20 acquires data during the maintenance work from each constituent of the manufacturing equipment 1, and causes the process to proceed to step S32. In other words, the control unit 20 acquires equipment data during the maintenance work from the control device 3, stores the equipment data into the equipment data storage unit 41, acquires maintenance moving image data of the maintenance person 7 from the imaging device 4, stores the maintenance moving image data into the moving image data storage unit 42, acquires screen transition data of a screen operated by the maintenance person 7 from the operation terminal 5, and stores the screen transition data into the screen transition data storage unit 43.

In step S32, the control unit 20 determines whether or not the maintenance work has been completed, and returns to step S31 when it is determined that the maintenance work has not been completed, and causes the process to proceed to step S33 when it is determined that the maintenance work has been completed. Whether or not the maintenance work has been completed may be determined on the basis of, for example, a maintenance work completion signal acquired from the control device 3 or the operation terminal 5.

In step S33, the control unit 20 performs a process of associating equipment data encompassing before and after the maintenance work corresponding to the event with at least one of the maintenance moving image data and the screen transition data and storing the association result into the second data storage unit 45 as the second data, and causes the process to proceed to step S34.

In step S34, the control unit 20 performs a maintenance information generation process. In other words, the control unit 20 performs a process of generating maintenance information corresponding to each piece of the event information (that is, a classified event) by associating the event information generated in the event information generation process with the second data stored in the second data storage unit 45, and causes the process to proceed to step S35.

In step S35, the control unit 20 performs a process of setting a label (second label) for identifying the maintenance information generated in step S34, and, in the next step S36, stores the maintenance information into the maintenance information storage unit 46, and then finishes the process.

Figure 15:
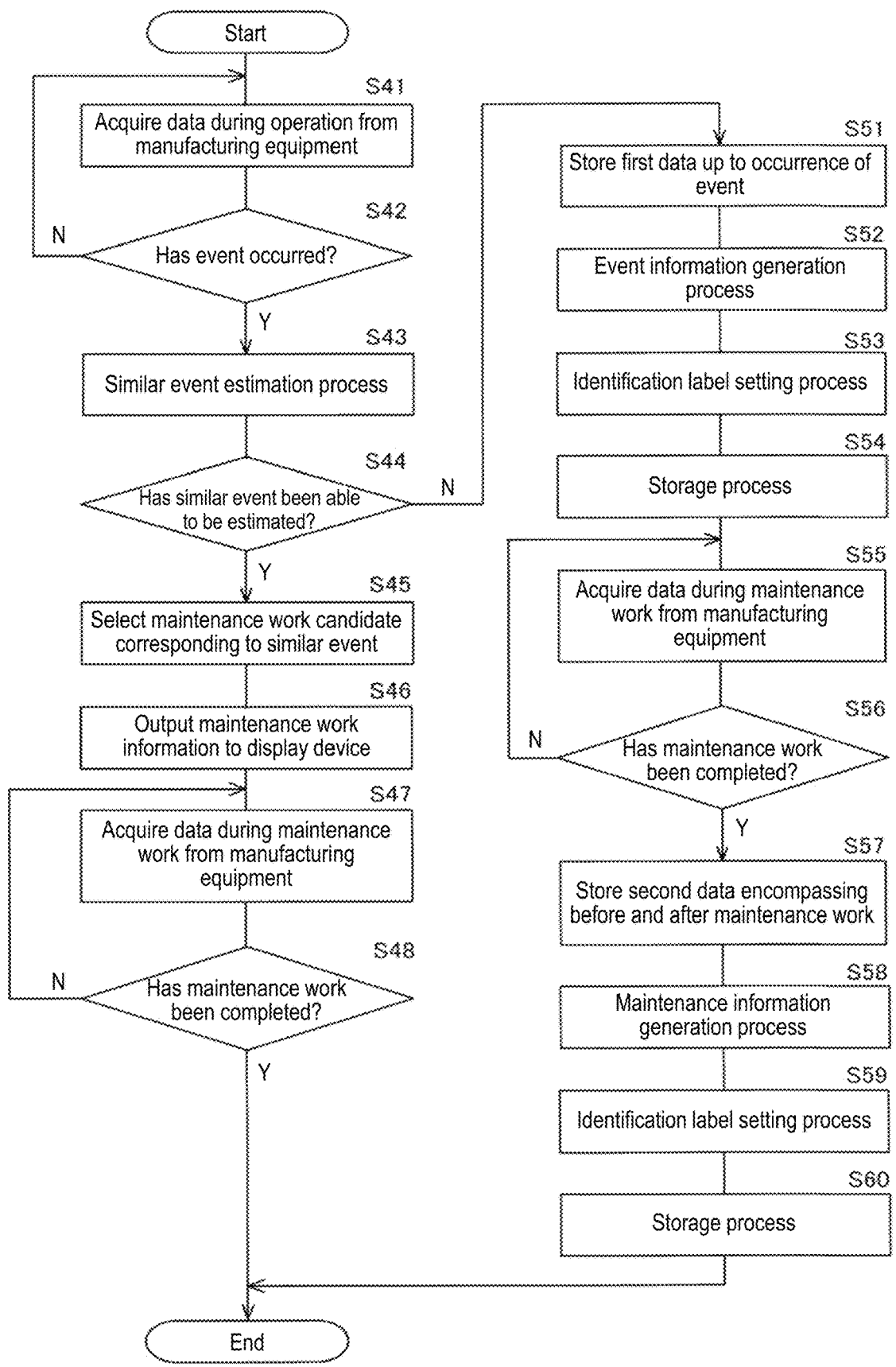
FIG. 15 is a flowchart illustrating a process operation example performed by the control unit configuring the information management device according to the embodiment.

FIG. 15 is a flowchart illustrating a process operation performed by the control unit 20 configuring the information management device 10 according to the embodiment. The present process operation is a maintenance information output operation, and is executed, for example, during the operation of the manufacturing line 2.

First, in step S41, the control unit 20 acquires data during the operation from the manufacturing equipment 1. For example, the control unit 20 acquires equipment data from the control device 3, and causes the process to proceed to step S42.

In the next step S42, the control unit 20 determines whether or not an event has occurred during the operation of the manufacturing line 2, and returns to step S41 when it is determined that the event has not occurred, and causes the process to proceed to step S43 when it is determined that the event has occurred. Whether or not the event has occurred may be determined on the basis of, for example, an event detection signal acquired from the control device 3 or the operation terminal 5.

In step S43, the control unit 20 performs a process of estimating a similar event that is similar to the event detected in step S42. For example, the control unit 20 reads the pieces of event information generated in the event information generation process from the storage unit 40, and estimates, as the similar event, an event that is the same as or the most similar to the detected event among the read pieces of event information.

More specifically, for example, in a case where label information is added to the detected event, the control unit 20 may extract a classified event for which the same label is set from the pieces of event information, and may estimate the classified event as the similar event.

The control unit 20 may compare an error route in a control flow immediately before leading to the detected event with an error route in a control flow in each classified event of the event information, extract a classified event related to the same error route from the pieces of event information, and estimate the extracted classified event as the similar event.

The control unit 20 may compare a change (a difference, a deviation, or the like) in equipment data (setting data or measured data) before and after the occurrence of the detected event with a change in equipment data in each classified event of the event information, extract a classified event indicating the same or approximate change from the pieces of event information, and estimate the extracted classified event as the similar event.

The control unit 20 may compare the degree of abnormality of a work behavior of the worker 6 and a change in equipment data before and after the occurrence of the detected event with the degree of abnormality of a work behavior and a change in the equipment data in each classified event of the event information, extract a classified event indicating the same or approximate degree of abnormality and the same or approximate change from the pieces of event information, and estimate the extracted classified event as the similar event. The control unit 20 performs the similar event estimation process, and then causes the process to proceed to step S44.

In step S44, the control unit 20 determines whether or not the similar event has been able to be estimated, and causes the process to proceed to step S45 when the similar event has been able to be estimated. In step S45, the control unit 20 performs a process of selecting a maintenance work candidate corresponding to the similar event estimated in step S43 from among the pieces of maintenance information stored in the maintenance information storage unit 46, and causes the process to proceed to step S46.

In step S46, the control unit 20 performs a process of outputting information regarding the maintenance work candidate selected in step S45 to the display device 51 to present information regarding the maintenance work on a screen of the display device 51, and causes the process to proceed to step S47.

In step S47, the control unit 20 acquires data during the maintenance work from the manufacturing equipment 1, and causes the process to proceed to step S48. For example, the data during the maintenance work is acquired from the control device 3 or the operation terminal 5.

In step S48, the control unit 20 determines whether or not the maintenance work has been completed, and returns to step S47 when it is determined that the maintenance work has not been completed, and finishes the process when it is determined that the maintenance work has been completed. Whether or not the maintenance work has been completed may be determined on the basis of, for example, a maintenance work completion signal acquired from the control device 3 or the operation terminal 5.

On the other hand, in step S44, when it is determined that the similar event has not been able to be estimated (in other words, the event is not classified), the control unit 20 causes the process to proceed to step S51. Processes in steps S51 to S54 are processes of generating event information with respect to a detected event that is not classified, and are the same as the processes in steps S23 to S26 described above, and thus descriptions thereof will not be repeated here.

In step S54, the control unit 20 stores the generated event information into the storage unit 40, and then causes the process to proceed to step S55. Processes in steps S55 to S60 are processes of generating maintenance information corresponding to the event that is not classified, and are the same as the processes in steps S31 to S36, and thus descriptions thereof will not be repeated here. In step S60, the control unit 20 stores the generated maintenance information into the maintenance information storage unit 46, and then finishes the process.

Effects

According to the information management device 10 related to the embodiment, the event information generation unit 24 associates an event having occurred in the manufacturing line 2 with the first data (at least any of data relating to an error route in the control flow, setting data and measured data for the manufacturing equipment 1, and work moving image data of the worker 6) up to the occurrence of the event. Consequently, the event can be classified finely on the basis of the data (at least any of the data relating to the error route in the control flow, and the setting data and the measured data for the manufacturing equipment 1) regarding the manufacturing line 2 or the work moving image data of the worker 6 for the manufacturing line 2 up to the occurrence of the event.

The maintenance information generation unit 26 associates event information with the second data (including any of history data of at least one of setting data and measured data for the manufacturing equipment 1, maintenance work process data indicating a maintenance behavior, maintenance moving image data, and screen transition data of the operation terminal 5) encompassing before and after maintenance work, and thus generates maintenance information (information regarding a work process, a maintenance behavior, or an operation screen of the operation terminal 5) corresponding to each piece of the event information (each classified event).

Therefore, detailed and specific maintenance information can be managed in association with each classified event. Consequently, in a case where an event occurs during an operation of the manufacturing line 2, it is possible to present information for maintenance work in which a control status or an operation status of each constituent of the manufacturing equipment 1 or a work status of the worker 6 up to the occurrence of the event is taken into consideration and a specific procedure can be easily understood, by using the maintenance information stored in the maintenance information storage unit 46. Even an inexperienced maintenance person can perform appropriate and efficient maintenance work by using the information management device 10.

Modification Examples

As mentioned above, the embodiment of the present invention has been described in detail, but the above description is only an example in all aspects. Needless to say, various modifications or changes may occur without departing from the scope of the present invention.

For example, some or all of the constituents of the information management device 10 may be incorporated into the control device 3, and an information management system including the control device 3, the imaging device 4, the operation terminal 5, and the information management device 10 may be employed.

In the information management device 10 related to the embodiment, a description has been made of the configuration in which the first data storage unit 44 and the second data storage unit 45 are provided separately from the equipment data storage unit 41, the moving image data storage unit 42, and the screen transition data storage unit 43, but the present invention is not limited to the configuration. In other embodiments, there may be a configuration in which the first data storage unit and the second data storage unit are provided in the equipment data storage unit 41, the first data storage unit and the second data storage unit are provided in the moving image data storage unit 42, and the first data storage unit and the second data storage unit are provided in the screen transition data storage unit 43.

Appendix

Embodiments of the present invention may be described as in the following appendix, but are not limited thereto.
(Appendix 1)
The information management device (10) managing information for assisting with maintenance corresponding to an event having occurred in equipment (1), the information management device (10) including
    a first data storage unit (44) that stores first data relating to at least one of data regarding the equipment (1) and operation behavior data for the equipment (1) up to occurrence of the event;
    an event information generation unit (24) that classifies the event on the basis of the first data stored in the first data storage unit (44), and generates event information associated with the first data;
    a second data storage unit (45) that stores second data in which data regarding the equipment (1) and maintenance behavior data for the equipment (1) encompassing before and after maintenance work corresponding to the event are associated with each other;
    a maintenance information generation unit (26) that generates maintenance information corresponding to each piece of the event information by associating the event information generated by the event information generation unit (24) with the second data stored in the second data storage unit (45); and
    a maintenance information storage unit (46) that stores the maintenance information which corresponds to each piece of the event information and is generated by the maintenance information generation unit (26).
(Appendix 2)
An information management method of managing information for assisting with maintenance corresponding to an event having occurred in equipment (1), the information management method including
a first storage step of storing into a first data storage unit (44) first data relating to at least one of data regarding the equipment (1) and operation behavior data for the equipment (1) up to occurrence of the event;
an event information generation step of classifying the event on the basis of the first data stored in the first data storage unit (44), and generating event information associated with the first data;
a second storage step of storing into a second data storage unit (45) second data in which data regarding the equipment (1) and maintenance behavior data for the equipment (1) encompassing before and after maintenance work corresponding to the event are associated with each other;
a maintenance information generation step of generating maintenance information corresponding to each piece of the event information by associating the event information generated in the event information generation step with the second data stored in the second data storage unit (45); and
a maintenance information storage step of storing into a maintenance information storage unit (46) the maintenance information which corresponds to each piece of the event information and is generated in the maintenance information generation step.

INDUSTRIAL APPLICABILITY

The present invention is applicable to a manufacturing line including equipment that manufactures, produces, or transports various products, components, or articles, or a system including the equipment or the manufacturing line, and can be widely used in various industrial fields requiring maintenance of equipment or the like.

The invention claimed is:

1. An information management device managing information for assisting with maintenance corresponding to an event having occurred in a manufacturing equipment comprising a manufacturing line and a control device for controlling the manufacturing line, the information management device comprising:
a memory; and
a processor, configured to:
store, in the memory, first data relating to data regarding the manufacturing equipment including data relating to an error route in a control flow for the manufacturing line and operation behavior data for the manufacturing equipment relating to a time period before and up to occurrence of the event, wherein:
the control flow comprises a plurality of steps executed by the control device; and
the first data comprises work moving image data of a worker;
classify the event based on the first data relating to the error route and the work moving image data, and generate event information associated with the first data relating to the error route for the classified event, wherein the event information includes one or more pieces;
store second data in which data regarding the manufacturing equipment and maintenance behavior data are associated with each other in the memory, wherein the association of the data regarding the manufacturing equipment and the maintenance behavior data relates to a time period that encompasses before and after maintenance work corresponding to the event;
generate maintenance information corresponding to each piece of the event information by associating the event information for the classified event with the second data;
store the maintenance information which corresponds to each piece of the event information in the memory; and
in response to another event occurring in another manufacturing equipment and being classified the same as the event that occurred in the manufacturing equipment, output the maintenance information on a display device to present information regarding to perform a maintenance work on the another manufacturing equipment and determine that the maintenance work on the another manufacturing equipment has been completed based on a maintenance work completion signal issued from the another manufacturing equipment.

2. The information management device according to claim 1,
wherein the processor classifies the event based on the data relating to the error route, and generates information associated with the data relating to the error route for the classified event, thereby generating the event information.

3. The information management device according to claim 1,
wherein the first data further comprises data relating to at least one of setting data and measured data for the manufacturing equipment, which is included in the data regarding the manufacturing equipment, and
wherein the processor is further configured to:
calculate a degree of abnormality with respect to a normal operation behavior based on the work moving image data of the worker; and
calculate a degree of divergence from a normal value based on a change in the data regarding the manufacturing equipment,
wherein the processor classifies the event based on the degree of abnormality and the degree of divergence, and generates information in which the degree of abnormality and the degree of divergence are associated for the classified event, thereby generating the event information.

4. The information management device according to claim 1, wherein the processor is further configured to:
set a first label for identifying each piece of the event information.

5. The information management device according to claim 1,
wherein the second data comprises history data of at least one of setting data and measured data for the manufacturing equipment encompassing before and after the maintenance work, which is included in s the data regarding the manufacturing equipment, and comprises one or more pieces of maintenance work process data included in the maintenance work that are included in the maintenance behavior data, and
wherein the history data and each piece of the maintenance work process data corresponding to the history data are stored in the memory in association with each other.

6. The information management device according to claim 1, wherein the second data comprises history data of at least one of setting data and measured data for the manufacturing equipment encompassing before and after the maintenance work, which is included in the data regarding the manufacturing equipment, and comprises maintenance moving image data of a maintenance person, which is included in the maintenance behavior data, and wherein the history data and the maintenance moving image data corresponding to the history data are stored in the memory in association with each other.

7. The information management device according to claim 1, wherein the second data comprises history data of at least one of setting data and measured data for the manufacturing equipment encompassing before and after the maintenance work, which is included in the data regarding the manufacturing equipment, and comprises operation transition data for an operation part operated by a maintenance person, which is included in the maintenance behavior data, and wherein the history data and the operation transition data corresponding to the history data are stored in the memory in association with each other.

8. The information management device according to claim 1, wherein the processor is further configured to:

set a second label for identifying the maintenance information which corresponds to each piece of the event information.

9. The information management device according to claim 1, wherein the processor is further configured to:

detect the occurrence of the event in the manufacturing equipment;

estimate a similar event from among pieces of the event information in a case where the event is detected;

select a maintenance work candidate corresponding to the similar event from among pieces of the maintenance information stored in the memory; and output information regarding the maintenance work candidate.

10. The information management device according to claim 9, wherein the processor estimates the similar event based on at least one of the data regarding the manufacturing equipment and the operation behavior data for the manufacturing equipment up to the occurrence of the event and the event information.

11. The information management device according to claim 9, wherein the processor is further configured to:

store the event and the first data into the memory in a case where the similar event has not been able to be estimated.

12. An information management method of managing information for assisting with maintenance corresponding to an event having occurred in a manufacturing equipment comprising a manufacturing line and a control device for controlling the manufacturing line, the information management method comprising:

storing into a memory first data relating to at least one of data regarding the manufacturing equipment including data relating to an error route in a control flow for the manufacturing line and operation behavior data for the manufacturing equipment relating to a time period before and up to occurrence of the event, wherein the control flow comprises a plurality of steps executed by the control device, and the first data comprises work moving image data of a worker;

classifying the event based on the first data relating to the error route and the work moving image data, and generating event information associated with the first data relating to the error route for the classified event, wherein the event information includes one or more pieces;

storing into the memory second data in which data regarding the manufacturing equipment and maintenance behavior data are associated with each other in the memory, wherein the association of the data regarding the manufacturing equipment and the maintenance behavior data relates to a time period that encompasses before and after maintenance work corresponding to the event;

generating maintenance information corresponding to each piece of the event information by associating the event information for the classified event with the second data;

storing into the memory the maintenance information which corresponds to each piece of the event information; and in response to another event occurring in another manufacturing equipment and being classified the same as the event that occurred in the manufacturing equipment, outputting the maintenance information on a display device to present information regarding to perform a maintenance work on the another manufacturing equipment and determining that the maintenance work on the another manufacturing equipment has been completed based on a maintenance work completion signal issued from the another manufacturing equipment.

13. The information management method according to claim 12, further comprising:

detecting the occurrence of the event in the manufacturing equipment;

estimating a similar event from among pieces of the event information in a case where the event is detected;

selecting a maintenance work candidate corresponding to the similar event from among pieces of the maintenance information stored in the memory; and outputting information regarding the maintenance work candidate.

14. The information management method according to claim 13, wherein the similar event is estimated based on at least one of the data regarding the manufacturing equipment and the operation behavior data for the manufacturing equipment up to the occurrence of the event and the event information.

* * * * *